United States Patent [19]
Kim et al.

[11] Patent Number: 6,012,856
[45] Date of Patent: Jan. 11, 2000

[54] METHOD AND ARTICLE FOR SPLICING OPTICAL FIBERS COATED WITH METAL AND REINFORCED SPLICE FORMED THEREBY

[75] Inventors: Sung-Jun Kim, Pyeongtaek; Yeong-Gyu Lee, Suwon, both of Rep. of Korea

[73] Assignee: SamSung Electronics Co., Ltd., Kyungki-do, Rep. of Korea

[21] Appl. No.: 08/902,131

[22] Filed: Jul. 30, 1997

[30] Foreign Application Priority Data

Jul. 30, 1996 [KR] Rep. of Korea ............ 96-31523

[51] Int. Cl.⁷ ............................................ G02B 6/255
[52] U.S. Cl. ................................. 385/99; 385/98
[58] Field of Search ............................. 385/95–99

[56] References Cited

U.S. PATENT DOCUMENTS

| | | | |
|---|---|---|---|
| 4,109,369 | 8/1978 | Taylor | 29/467 |
| 4,254,865 | 3/1981 | Pacey et al. | 206/316 |
| 4,261,644 | 4/1981 | Giannaris | 350/96.21 |
| 4,404,010 | 9/1983 | Bricheno et al. | 65/4.2 |
| 4,537,468 | 8/1985 | Degoix et al. | 350/96.21 |
| 4,733,933 | 3/1988 | Pikulski | 350/96.2 |
| 4,863,234 | 9/1989 | Gladenbeck et al. | 350/96.21 |
| 4,865,413 | 9/1989 | Hübner et al. | 350/96.21 |
| 5,013,123 | 5/1991 | Patterson | 350/96.21 |
| 5,015,062 | 5/1991 | Finzel | 350/96.21 |
| 5,155,787 | 10/1992 | Carpenter et al. | 385/98 |
| 5,216,736 | 6/1993 | Essert | 385/96 |
| 5,247,598 | 9/1993 | Takimoto et al. | 385/99 |
| 5,347,606 | 9/1994 | Johansen | 385/95 |
| 5,748,817 | 5/1998 | Xu et al. | 385/51 |

FOREIGN PATENT DOCUMENTS

| | | | |
|---|---|---|---|
| 0164784 A1 | 5/1985 | European Pat. Off. | 385/99 |
| 0462710 A1 | 12/1991 | European Pat. Off. | 385/99 |
| 2038016 | 7/1980 | United Kingdom | 385/99 |
| WO 84/02582 | 7/1984 | WIPO | 385/99 |

*Primary Examiner*—John D. Lee
*Assistant Examiner*—Victoria D. Hao
*Attorney, Agent, or Firm*—Robert E. Bushnell, Esq.

[57] ABSTRACT

A method and article for splicing metal clad optical fibers and protecting the spliced portion, and a reinforced splice between metal clad optical fibers, is provided. The method comprises the steps of fusing the exposed ends of metal clad optical fibers together, aligning the thus formed splicing area over a metal groove in a lower plate, depositing a metal adhesive on the upper surface of the lower plate, sealing the splicing area by laying a metal groove of an upper plate over that of the lower plate, and uniformly coating and hardening the metal adhesive on the splicing area of the optical fibers by applying high temperature air to the metal grooves. As described above, the splicing area of the optical fibers is protected by a soldering cream adhered thereto so that a high tensile strength is provided. Also, the length of the spliced portion is short so that the spliced optical fiber can be mounted in a small space in a device using optical fibers.

48 Claims, 2 Drawing Sheets

METHOD AND ARTICLE FOR SPLICING OPTICAL FIBERS COATED WITH METAL AND REINFORCED SPLICE FORMED THEREBY

CLAIM OF PRIORITY

This application makes reference to, incorporates the same herein, and claims all benefits accruing under 35 U.S.C. §119 from an application for METHOD FOR SPLICING OPTICAL FIBERS COATED WITH METAL earlier filed in the Korean Industrial Property Office on the 30$^{th}$ day of July 1996 and there duly assigned Ser. No. 1996-31523, a copy of which application is annexed hereto.

BACKGROUND OF THE INVENTION

The present invention relates to a method of splicing optical fibers, and more particularly, to a method of reinforcing and protecting a fusion splice between two optical fibers coated with a metal while reducing the size of the reinforced region.

Optical fiber communications systems, and particularly long-distance communications networks, utilize numerous individual optical fibers that must be spliced together end-to-end to provide complete data paths for optical data signals. Such splices must meet two essential criteria: first, they must not unacceptably degrade the quality of transmitted signals, and second, they must not unacceptably weaken the fiber structure. Fusion splicing between glass fibers has seen considerable acceptance as a practical method to achieve the first criterion, and various approaches have adequately addressed the fiber strength criterion for typical fiber applications.

U.S. Pat. Nos. 4,109,369 of Methods of Jointing Optical Fibres issued to Taylor and 4,254,865 of Protective Package for an Optical Fiber Splice issued to Pacey et al. provide examples of one of these approaches. The first shows a system in which the fiber ends are placed in fiber-shaped groove formed in a non-resilient metal plate and secured there by a second plate clamped to the first plate. In the second, a reinforcement article composed of two plastic plate-like halves is secured around the splice area by a layer of adhesive between the halves. U.S. Pat. No. 4,863,234 of Protective Sheath for Optical Waveguide Splice issued to Gladenbeck et al., on the other hand, shows a popular method using a heat-shrinkable plastic tube collapsed about the fiber in the area of the splice. U.S. Pat. No. 4,537,468 of Reinforced Optical Fiber Butt Weld Connection issued to Degoix et al. discloses a third approach using a metal capillary tube, positioned around the desheathed ends of the spliced fibers at the site of the splice, and a particular type of adhesive disposed in the space between the tube and the desheathed fiber ends.

These and similar splice reinforcement techniques provide an acceptable range of solutions for protection and reinforcement of fiber splices in many contexts, but they all have certain limitations that have made them unsuitable for some applications. In particular, some application environments subject optical fibers as a matter of course to unusually harsh conditions such as extremes of temperature, humidity, and mechanical stress. Metal-coated optical fibers have proven to withstand such environments successfully in long-term use, but they present special problems for meeting the two criteria mentioned above for splice protection.

In general, an optical fiber coated with a metal has a significantly greater tension-resistant strength in comparison to optical fibers with polymer sheaths. Metal-coated fibers are also highly resistant to damage from fine bends and from winding. When a metal-coated optical fiber is fusion-spliced, however, it has been difficult to maintain adequately the overall tensile strength of the fiber through previously known methods for reinforcement of the splice. Moreover, adequate reinforcement from a plastic or tubular metal article can easily require the article to have an inconveniently large length dimension relative to bending radiuses frequently encountered in field applications. This large length dimension prevents the spliced area of the fiber from being installed around tight bends, which of course largely nullifies a metal-coated optical fiber's advantage of resistance to bending damage.

I have therefore found that a need exists for a method and article for reinforcing and protecting metal-coated optical fibers while overcoming the limitations of existing approaches using polymers or other materials for reinforcement. Such an invention will substantially preserve the tensile strength of the unspliced metal-coated optical fiber, will do so without sacrificing the metal-coated fiber's ability to undergo tight bends and winding without damage, and will not reduce the spliced fiber's resistance to harsh environments. Preferably the invention will be capable of being carried out in a variety of contexts, including field installation. Ideally, it could be carried out using simple procedures and inexpensive, easily fabricated materials.

SUMMARY OF THE INVENTION

To solve the above problem, it is an object of the present invention to provide a method and article for reinforcing a splice in a metal-coated optical fiber.

It is a another object to provide such a method and article whereby the reinforced splice has great tensile strength.

It is a further object to provide such a method and article to enable simplified installation of the spliced fiber around bends through reduction in the length of the spliced portion.

It is a still further object to provide such a method and article whereby the reinforcing article can be easily and compactly mounted as compared to previously known splice reinforcing and protecting methods applicable to metal-coated optical fibers.

To accomplish these and other objects, the present invention provides a method and article for reinforcing splices in metal-coated optical fibers and a reinforced splice between such fibers. The method comprises several steps, including the step of aligning a splicing area common to a plurality of metal clad optical fibers over a first metal groove disposed in an upper surface a lower plate, with the first metal groove having a first inside surface and a first predetermined shape corresponding to the splicing area and with the splicing area including a contact point at which an exposed end of each one of the plurality of metal clad optical fibers is fused to an exposed end of energy other one of said plurality of metal clad optical fibers. The method includes a further step of depositing an amount of a metal adhesive upon the upper surface of the lower plate, with the amount being sufficient to provide a substantially uniform coating upon an outer surface of the splicing area. Also included is the step of positioning upon the splicing area a second metal groove disposed in a lower surface of an upper plate, with the second metal groove having a second inside surface and a second predetermined shape corresponding to a mirror image of the first predetermined shape. The method further includes the step of distributing and hardening the amount of metal adhesive into the substantially uniform coating upon the outer surface of the splicing area by applying heat the first and second metal grooves.

In a second aspect of the invention, an article is provided for reinforcing a splice between a plurality of metal clad optical fibers. The article includes a lower plate, an upper plate, and a substantially uniform coating of a metal adhesive. The lower plate has an upper surface and a first metal groove disposed in the upper surface. The first metal groove is adapted to receive a splicing area common to each one of the plurality of metal clad optical fibers. The splicing area includes a contact point formed by fusing together a plurality of exposed fiber ends, with each one of the plurality of exposed fiber ends corresponding to one of the plurality of metal clad optical fibers. The upper plate has a lower surface and a second metal groove disposed in the lower surface. The second metal groove is adapted to receive the splicing area. The substantially uniform coating of metal adhesive is disposed upon an outer surface of the splicing area and is fused sufficiently to bond together the first metal groove, the outer surface of the splicing area, and the second metal groove.

In a third aspect of the invention, a reinforced fusion splice is provided between a plurality of metal clad optical fibers. The reinforced fusion splice includes a splicing area connection the plurality of metal clad optical fibers, a lower plate, an upper plate, and a substantially uniform coating of a metal adhesive. The splicing area includes a contact point formed by fusing together a plurality of exposed optical fiber ends, with each one of the plurality of exposed optical fiber ends corresponding to one of the plurality of metal clad optical fibers. The lower plate has an upper surface and a first metal groove disposed in the upper surface, with the first metal groove being adapted to receive the splicing area. The upper plate has a lower surface and a second metal groove disposed in the lower surface, with the second metal groove being adapted to receive the splicing area. The substantially uniform coating of metal adhesive is adhered to an outer surface of the splicing area and is fused onto the first and second metal grooves and hardened sufficiently to bond together the first metal groove, the outer surface of the splicing area, and the second metal groove.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein.

Figure 3:
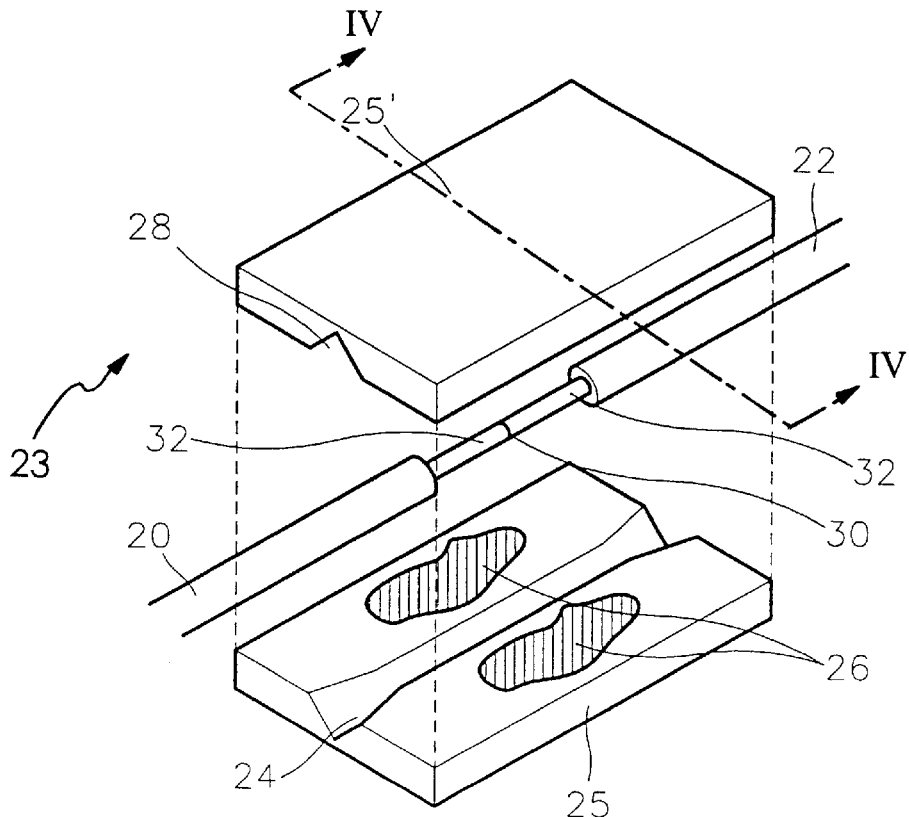
Figure 4:
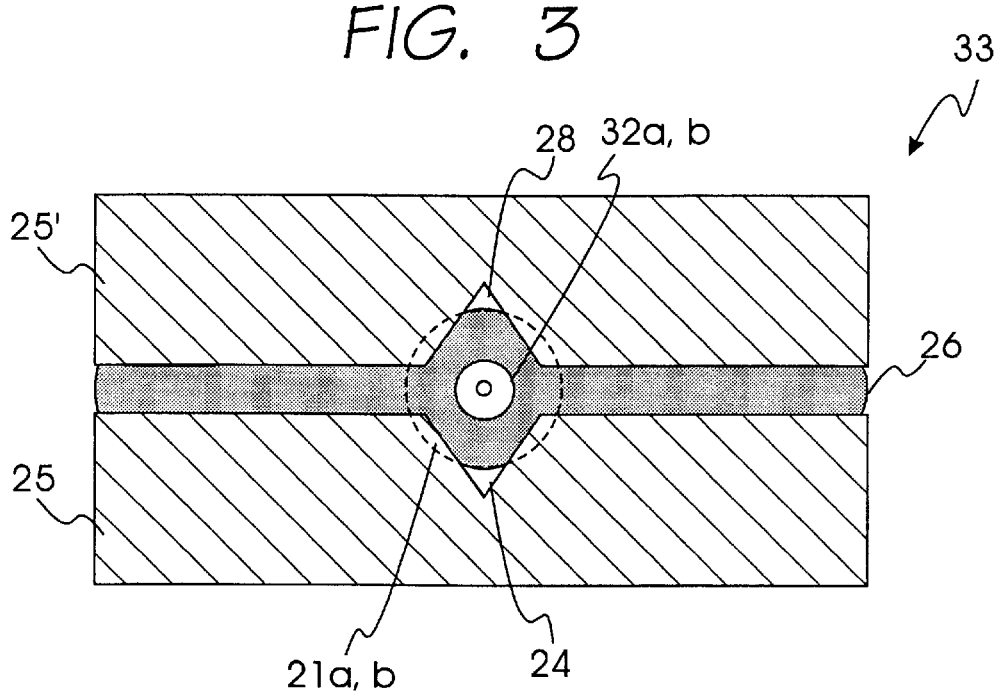

FIG. 3 is an exterior view of components of a splice reinforcing article, and a splice in a metal-coated optical fiber to be reinforced therewith, illustrative of an article and a process for reinforcing a splice in a metal-coated optical fibers according to the present invention; and FIG. 4 is a transverse cross-section, taken through broken line IV of FIG. 3, of a reinforced fusion splice produced in accordance with the principles of the present invention.

DETAILED DESCRIPTION OF THE INVENTION

Figure 1:
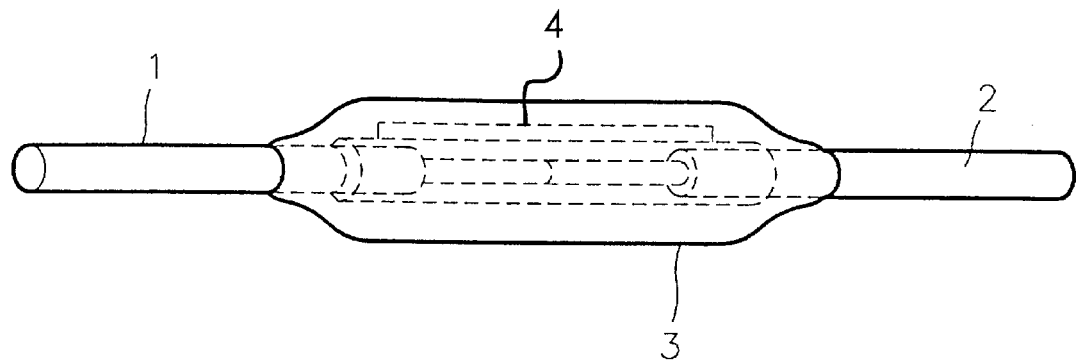
FIG. 1 is a view of metal-coated optical fibers which are spliced by a Prior Art splice reinforcing method using a heat-shrinkable tube.

FIG. 1 is a view of a metal-coated optical fiber containing a fusion splice reinforced by an existing splice reinforcing method using a heat-shrinkable tube. After a first metal clad optical fiber 1 and a second metal-coated optical fiber 2 are fusion-spliced, a heat-shrinkable tube 3 is positioned to cover the fusion site. A reinforcing member 4, such as a length of wire, may be positioned adjacent the fusion site, within the bore of heat shrinkable tube 3, to bear stresses on the finished splice that would otherwise be borne by the fusion site. Tube 3 is then shrunk by heat and thereafter, in conjunction with wire 4, supports fibers 1 and 2 at the fusion site. The length of tube 3, after it is shrunk, defines a spliced portion for fibers 1 and 2.

Use of a heat-shrinkable tube reinforcement requires the spliced portion, which include the area where optical fibers are fused, to be quite long: as much as approximately 60 mm. An optical fiber splice of this type therefore does not have sufficient flexibility to be used effectively in a situation where bending of the fiber is required for installation. A similar limitation applies in the case of reinforcement with metal capillary tubes, which are preferably in the range of 100 mm in length.

Figure 2:
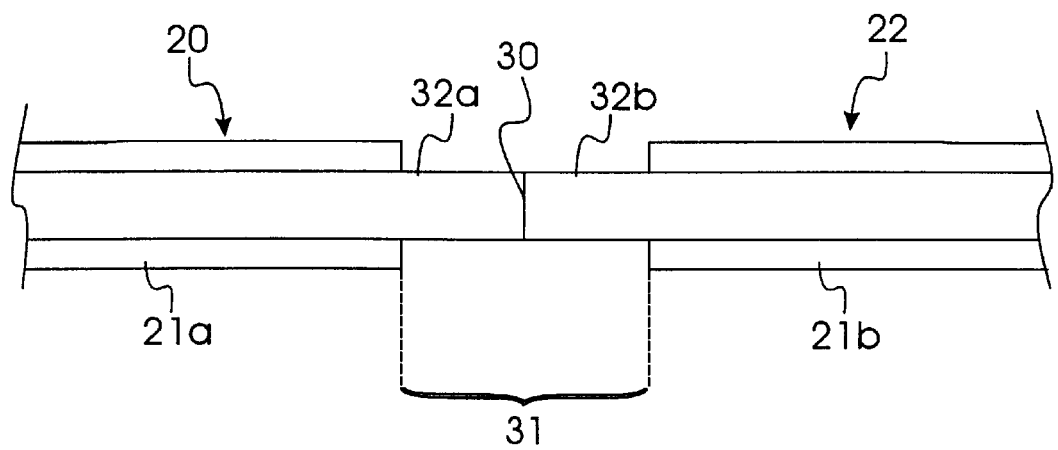
FIG. 2 is a longitudinal cross-section of two metal clad optical fibers joined together in a splicing area in a manner appropriate for practice of the present invention.

FIG. 2 shows metal clad optical fibers 20 and 22 with ends abutting at a contact point 30 where they have been fused by a fusion splicer (not shown). Optical fibers 20 and 22 have metal coatings 21a and 21b, respectively, portions of which are removed at the fiber ends to define a splicing area 31. The outer surfaces of optical clads 32a and 32b are exposed in splicing area 31 and contact each other at the contact point 30.

FIG. 3 shows the several components of a splice reinforcing article 23 ready for assembly according to the method of the present invention. A lower plate 25 has a metal groove 24 defined in an upper surface thereof to receive the end portions of fibers 20 and 22 including splicing area 31. Lower plate 25 preferably is composed of a metal with strength and thermal properties suitable for reinforcing the splice, such properties being well known in the art. Alternatively, metal groove 24 may be a metal liner bonded to a groove in lower plate 25, with lower plate 25 being composed of a suitable metal or non-metal material. An upper plate 25' has a metal groove 28 and preferably is metal and has features similar to those of lower plate 25.

Plates 25 and 25' are preferably rectangular in shape, which minimizes fabrication costs. Their dimensions also (thickness t, width w transverse to fibers 20 and 22, and length I longitudinal to fibers 20 and 22) may be chosen to optimize manufacturing factors. In particular, any value of t is acceptable that allows easy fabrication of metal grooves 24 and 28. The longitudinal dimension of plates 25 and 25', which defines the spliced portion for the present invention, has a length 1 that may be chosen appropriately to provide tensile strength as required for the splice. Length l should be greater than the length of splicing area 31 and, in a preferred embodiment, is in the range of 10–30 mm. Prototype plates, made for metal clad optical fibers having an optical clad outside diameter of 125 $\mu$m and a metal coating outside diameter of 250 $\mu$m, had dimensions t=1 mm, w=1.5–2.5 mm, and l=10–17 mm.

In a preferred embodiment, metal grooves 24 and 28 both have V-shaped cross-sections. Alternatively, metal grooves 24 and 28 may have any other cross-section suitable for forming high-strength bond between the grooves and metal clads 32a and 32b of optical fibers 20 and 22. They may have uniform depth and width across the length of plates 25 and 25', but preferably are somewhat wider and deeper at the ends of plates 25 and 25' than in the middle regions thereof. This difference at the ends of the grooves helps to accommodate the greater diameter of fibers 20 and 22 presented by metal clads 21a and 21b at the edges of splicing area 31. In a set of prototype plates, for metal clad optical fibers having an optical clad outside diameter of 125 μm and a metal coating outside diameter of 250 μm, metal grooves 24 and 28 were V-grooves. In the middle regions, these V-grooves had a depth of 74 μm and a width of 147 μm, while at the ends of the plates they were 500 μm deep and 500 μm wide.

Article 23 may be assembled by practicing the method of the present invention as follows. Soldering cream 26, employed as a metal adhesive, is deposited on the side surfaces of metal groove 24 of lower plate 25 in an amount sufficient to coat optical clads 32a and 32b in splicing area 31. Metal groove 28 of upper plate 25' is then laid over metal groove 24 of lower plate 25 to seal splicing area 31. Next, hot air is applied to metal grooves 24 and 28, at a temperature sufficient to cause soldering cream 26 to flow, so that the metal adhesive soldering cream 26 is uniformly coated onto optical clads 32a and 32b within splicing area 31, and to solidify. As an alternative to application of hot air, a soldering iron may be used for directly heating metal grooves 24 and 28, or a high temperature chamber may be used to apply heat.

FIG. 4 shows a cross-section taken at contact point 30 of a completed reinforced splice 33. Once soldering cream 26 has fused, a secure bond between the metal of metal grooves 24 and 28 and the metal of metal clads 21a and 21b will have been formed, as well as a similar bond between the upper surface of lower plate 25 and the lower surface of upper plate 25'. Unlike with pressure-sensitive adhesives and the like, soldering cream 26 fuses into a tight joint between metal grooves 24 and 28 and metal clads 21a and 21b, thereby allowing stresses to be transferred between the metal clads and the metal grooves. The joint therefore allows stresses that otherwise would largely be focused near contact point 30 to be distributed, through metal clads 32a and 32b, to portions of fibers 20 and 22 distant from the splice. This distribution effect permits the length of the spliced portion, defined by the plate length l, to be reduced to between approximately 10 mm and 30 mm. The method of the present invention thus permits use of a splice with a spliced portion small in comparison with the spliced portion of approximately 60 mm in length required when using an existing method for reinforcing a splice between two metal clad optical fibers.

As described above, according to the splicing and reinforcing method for metal clad optical fibers provided by the present invention, the contact point 30 of the optical fibers is protected by soldering cream 26 adhered thereto so that the high tensile strength of the metal-coated optical fiber is retained. Also, the length of the spliced portion is short, which minimizes the length of inflexible segments of the spliced optical fiber and therefore permits installation to be easily performed and the spliced optical fiber to be installed in small spaces. Persons of skill in the art will understand that the present invention, while illustrated here for the case of two optical fibers spliced together, applies equally well to the case of three or more optical fibers fused together at a common point to form a star-type junction.

What is claimed is:

1. A method of forming and reinforcing a splice between metal clad optical fibers, comprising the steps of:

aligning a splicing area common to a plurality of metal clad optical fibers over a first metal groove, with said first metal groove being disposed in an upper surface of a lower plate, having a first inside surface, and having a first predetermined shape corresponding to said splicing area and with said splicing area including a contact point at which an exposed end of each one of said plurality of metal clad optical fibers is fused to an exposed end of every other one of said plurality of metal clad optical fibers;

depositing an amount of a metal adhesive upon said upper surface of said lower plate, with said amount being sufficient to provide a substantially uniform coating upon an outer surface of said splicing area;

positioning upon said splicing area a second metal groove disposed in a lower surface of an upper plate, with said second metal groove having a second inside surface and having a second predetermined shape corresponding to a mirror image of said first predetermined shape; and distributing and hardening said amount of said metal adhesive into said substantially uniform coating upon said outer surface of said splicing area by applying heat to said first and second metal grooves.

2. The method of claim 1, further comprising the step of forming said contact point by fusing together said exposed end of each one of said plurality of metal clad optical fibers and said exposed end of every other one of said plurality of metal clad optical fibers.

3. The method of claim 1, wherein said upper and lower plates are substantially equal in length and their length is in the range of 10–30 mm.

4. The method of claim 1, wherein said plurality of metal clad optical fibers consists of two metal clad optical fibers and said predetermined shape is substantially linear.

5. The method of claim 4, wherein a length of said upper plate is substantially equal to a length of said lower plate and said lengths are in the range of 10–30 mm.

6. The method of claim 1, wherein said first and second metal grooves have substantially V-shaped cross sections.

7. The method of claim 1, wherein said first and second metal grooves have substantially semicircular shaped cross sections.

8. The method of claim 1, wherein said second metal groove has a cross sectional shape different from a cross sectional shape of said first metal groove.

9. The method of claim 1, wherein said lower plate is composed of a metal and said first metal groove is a groove defined in said upper surface of said lower plate.

10. The method of claim 1, wherein said first metal groove is a metal liner permanently connected to a groove defined in said upper surface of said lower plate.

11. The method of claim 10, wherein said metal liner is bonded to said groove with an adhesive.

12. The method of claim 10, wherein said metal liner is bonded to said groove by a mechanical bond.

13. The method of claim 1, wherein said upper plate is composed of a metal and said second metal groove is a groove defined in said lower surface of said upper plate.

14. The method of claim 1, wherein said second metal groove is a metal liner permanently connected to a groove defined in said lower surface of said upper plate.

15. The method of claim 14, wherein said metal liner is bonded to said groove with an adhesive.

16. The method of claim 14, wherein said metal liner is bonded to said groove by a mechanical bond.

17. The method of claim 1, wherein said step of distributing and hardening said metal adhesive by applying heat is performed by applying high temperature air to said first and second metal grooves.

18. The method of claim 1, wherein said step of distributing and hardening said metal adhesive by applying heat is performed by applying a heated soldering iron to at least one of said first and second metal grooves.

19. An article for reinforcing a splice between a plurality of metal clad optical fibers, said article comprising:

a lower plate having an upper surface and a first metal groove disposed in said upper surface, with said first metal groove being adapted to receive a splicing area common to each one of said plurality of metal clad optical fibers, with said splicing area including a contact point formed by fusing together a plurality of exposed optical fiber ends, and with each one of said plurality of exposed optical fiber ends corresponding to one of said plurality of metal clad optical fibers;

an upper plate having a lower surface and a second metal groove disposed in said lower surface, with said second metal groove being adapted to receive said splicing area; and a substantially uniform coating of a metal adhesive disposed upon an outer surface of said splicing area and fused sufficiently to bond together said first metal groove, said outer surface of said splicing area, and said second metal groove.

20. The article of claim 19, wherein a length of said upper plate is substantially equal to a length of said lower plate and said lengths are in the range of 10–30 mm.

21. The article of claim 19, wherein said plurality of metal clad optical fibers consists of two metal clad optical fibers and said predetermined shape is substantially linear.

22. The article of claim 19, wherein said first and second metal grooves have substantially V-shaped cross sections.

23. The article of claim 19, wherein said first and second metal grooves have substantially semicircular shaped cross sections.

24. The article of claim 19, wherein said second metal groove has a cross sectional shape different from a cross sectional shape of said first metal groove.

25. The article of claim 19, wherein said lower plate is composed of a metal and said first metal groove is a groove defined in said upper surface of said lower plate.

26. The article of claim 19, wherein said first metal groove is a metal liner permanently connected to a groove defined in said upper surface of said lower plate.

27. The article of claim 26, wherein said metal liner is bonded to said groove with an adhesive.

28. The method of claim 26, wherein said metal liner is bonded to said groove by a mechanical bond.

29. The article of claim 19, wherein said upper plate is composed of a metal and said second metal groove is a groove defined in said lower surface of said upper plate.

30. The article of claim 19, wherein said second metal groove is a metal liner permanently connected to a groove defined in said lower surface of said upper plate.

31. The article of claim 30, wherein said metal liner is bonded to said groove with an adhesive.

32. The article of claim 30, wherein said metal liner is bonded to said groove by a mechanical bond.

33. The article of claim 19, wherein said metal adhesive is a soldering cream.

34. A reinforced fusion splice between a plurality of metal clad optical fibers, said reinforced fusion splice comprising:

a splicing area connecting said plurality of metal clad optical fibers and including a contact point formed by fusing together a plurality of exposed optical fiber ends, with each one of said plurality of exposed optical fiber ends corresponding to one of said plurality of metal clad optical fibers;

an lower plate having an upper surface and a first metal groove disposed in said upper surface, with said first metal groove being adapted to receive said splicing area;

an upper plate having a lower surface and a second metal groove disposed in said lower surface, with said second metal groove being adapted to receive said splicing area; and a substantially uniform coating of a metal adhesive adhered to an outer surface of said splicing area, fused onto said first and second metal grooves, and hardened sufficiently to bond together said first metal groove, said outer surface of said splicing area, and said second metal groove.

35. The reinforced fusion splice of claim 34, wherein said metal adhesive is a soldering cream.

36. The reinforced fusion splice of claim 34, wherein a length of said upper plate is substantially equal to a length of said lower plate and said lengths are in the range of 10–30 mm.

37. The reinforced fusion splice of claim 34, wherein said plurality of metal clad optical fibers consists of two metal clad optical fibers and said predetermined shape is substantially linear.

38. The reinforced fusion splice of claim 34, wherein said first and second metal grooves have substantially V-shaped cross sections.

39. The reinforced fusion splice of claim 34, wherein said first and second metal grooves have substantially semicircular shaped cross sections.

40. The reinforced fusion splice of claim 34, wherein said second metal groove has a cross sectional shape different from a cross sectional shape of said first metal groove.

41. The reinforced fusion splice of claim 34, wherein said lower plate is composed of a metal and said first metal groove is a groove defined in said upper surface of said lower plate.

42. The reinforced fusion splice of claim 34, wherein said first metal groove is a metal liner permanently connected to a groove defined in said upper surface of said lower plate.

43. The reinforced fusion splice of claim 42, wherein said metal liner is bonded to said groove with an adhesive.

44. The reinforced fusion splice of claim 42, wherein said metal liner is bonded to said groove by a mechanical bond.

45. The reinforced fusion splice of claim 34, wherein said upper plate is composed of a metal and said second metal groove is a groove defined in said lower surface of said upper plate.

46. The reinforced fusion splice of claim 34, wherein said second metal groove is a metal liner permanently connected to a groove defined in said lower surface of said upper plate.

47. The reinforced fusion splice of claim 46, wherein said metal liner is bonded to said groove with an adhesive.

48. The reinforced fusion splice of claim 46, wherein said metal liner is bonded to said groove by a mechanical bond.

* * * * *